United States Patent
Naitou (10) Patent No.: US 9,783,160 B2
(45) Date of Patent: Oct. 10, 2017

(54) DOOR UNLOCKING SYSTEM

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Kazutaka Naitou, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/038,390

(22) PCT Filed: Nov. 10, 2014

(86) PCT No.: PCT/JP2014/079672
§ 371 (c)(1),
(2) Date: May 20, 2016

(87) PCT Pub. No.: WO2015/079892
PCT Pub. Date: Jun. 4, 2015

(65) Prior Publication Data
US 2016/0304052 A1    Oct. 20, 2016

(30) Foreign Application Priority Data
Nov. 29, 2013    (JP) .................................. 2013-248090

(51) Int. Cl.
*G05B 19/00* (2006.01)
*B60R 25/24* (2013.01)
(Continued)

(52) U.S. Cl.
CPC .............. *B60R 25/24* (2013.01); *B60R 25/01* (2013.01); *E05B 81/04* (2013.01); *E05B 81/56* (2013.01);
(Continued)

(58) Field of Classification Search
CPC ..................................................... B60R 25/24
(Continued)

(56) References Cited

U.S. PATENT DOCUMENTS

2003/0146820 A1* 8/2003 Takamura ............... B60R 25/24
340/5.28
2004/0257267 A1* 12/2004 Mafune ................. B60R 25/246
342/107

(Continued)

FOREIGN PATENT DOCUMENTS

| JP | 2006118156 A | 5/2006 |
| JP | 2007332738 A | 12/2007 |

(Continued)

OTHER PUBLICATIONS

International Search Report and Written Opinion for application No. PCT/JP2014/079672 dated Jan. 6, 2015, 7 pages.
(Continued)

*Primary Examiner* — Santiago Garcia
(74) *Attorney, Agent, or Firm* — Reising Ethington, P.C.

(57) ABSTRACT

A door unlocking system with which only a specific door can also be unlocked if a user operates an operation unit of a communication device. A control device determines whether or not a communication device is present in any of regions Ra to Rc by communicating with the communication device located outside of the vehicle, using a wireless communication unit in the vehicle. When an operation signal transmitted from the communication device is received by the wireless communication unit in the vehicle in a case where
(Continued)

the communication device is present in any of the regions Ra to Rc, only a door that is associated with the region Ra (or Rb or Rc) in which the communication device is present is unlocked.

9 Claims, 8 Drawing Sheets (51) Int. Cl.
G07C 9/00 (2006.01)
B60R 25/01 (2013.01)
E05B 81/04 (2014.01)
E05B 81/56 (2014.01)
E05B 81/74 (2014.01)

(52) U.S. Cl.
CPC .......... *E05B 81/74* (2013.01); *G07C 9/00309* (2013.01); *G07C 2009/00769* (2013.01); *G07C 2009/00793* (2013.01); *G07C 2209/63* (2013.01)

(58) Field of Classification Search
USPC ........................................................ 340/5.61
See application file for complete search history.

(56) References Cited

U.S. PATENT DOCUMENTS

| | | | | |
|---|---|---|---|---|
| 2005/0073390 | A1* | 4/2005 | Inoguchi | B60R 25/245 340/5.72 |
| 2006/0255906 | A1* | 11/2006 | Ghabra | B60R 25/24 340/5.25 |
| 2007/0200668 | A1* | 8/2007 | Kurpinski | B60R 25/2009 340/5.64 |
| 2008/0001708 | A1* | 1/2008 | Nakashima | B60R 25/2009 340/5.72 |
| 2008/0314097 | A1* | 12/2008 | Rohlfing | E05B 81/78 70/256 |
| 2009/0058597 | A1* | 3/2009 | Shibagaki | B60R 25/24 340/5.72 |
| 2009/0079225 | A1* | 3/2009 | Katou | E05B 77/48 296/97.22 |
| 2009/0095038 | A1* | 4/2009 | Katagiri | B60R 25/22 70/392 |
| 2010/0214112 | A1* | 8/2010 | Ishihara | B60R 25/246 340/686.1 |
| 2010/0271171 | A1* | 10/2010 | Sampei | B60R 25/00 340/5.6 |
| 2011/0102164 | A1* | 5/2011 | Ghabra | B60R 25/04 340/426.13 |
| 2012/0105196 | A1* | 5/2012 | Katou | B60R 25/245 340/5.64 |
| 2012/0139691 | A1* | 6/2012 | Mori | B60R 25/24 340/5.2 |
| 2012/0286926 | A1* | 11/2012 | Higemoto | B60R 25/24 340/5.61 |
| 2013/0106602 | A1* | 5/2013 | Lickfelt | B60R 25/24 340/539.11 |
| 2013/0194069 | A1* | 8/2013 | Baudru | H03K 17/962 340/5.72 |
| 2013/0260597 | A1* | 10/2013 | Kurumizawa | H01R 13/639 439/347 |

FOREIGN PATENT DOCUMENTS

| | | |
|---|---|---|
| JP | 2008106548 A | 5/2008 |
| JP | 2009114851 A | 5/2009 |
| JP | 2009155864 A | 7/2009 |
| JP | 2009167638 A | 7/2009 |
| JP | 2010133099 A | 6/2010 |
| JP | 2013096163 A | 5/2013 |
| WO | WO2009014212 A1 | 1/2009 |

OTHER PUBLICATIONS

English Translation of International Search Report for application No. PCT/JP2014/079672 dated Jan. 6, 2015, 2 pages.

* cited by examiner

DOOR UNLOCKING SYSTEM

CROSS REFERENCE TO RELATED APPLICATIONS

This application claims the priority of Japanese patent application JP2013-248090 filed on Nov. 29, 2013, the entire contents of which are incorporated herein.

TECHNICAL FIELD

The present invention relates to door unlocking systems that unlock doors of a vehicle by a user operating an operation unit provided in a communication device (vehicle key) that is associated with the vehicle.

BACKGROUND ART

A door locking system that unlocks or locks doors of a vehicle if a user who carries a communication device (vehicle key) associated with the vehicle operates an operation unit provided in an outer surface of a door of the vehicle, also known as a so-called smart entry system is installed in vehicles. Furthermore, a door locking system that unlocks or locks doors of a vehicle if a user operates an operation unit (an unlocking button or a locking button) provided in a communication device, also known as a so-called keyless entry system is installed in vehicles.

In general, these door locking systems are configured to unlock all doors if the doors are in a locked state when the operation unit of the vehicle or the operation unit of the communication device is operated, and lock all doors if the doors are in an unlocked state.

Door locking systems have also been proposed that determine, when unlocking doors of a vehicle, the position where a communication device is present relative to the vehicle, and unlocks only the door that corresponds to the position where the communication device is present (e.g., see JP2010-133099A (Patent Document 1)). In the system disclosed in Patent Document 1, if, for example, a user who carries the communication device operates an operation unit provided in a door on the driver seat side, only the door on the driver seat side is unlocked. Thus, since only the door near the user (communication device) is unlocked, a suspicious person who is hiding on the opposite side of the vehicle can be prevented from entering the vehicle from other doors.

SUMMARY OF INVENTION

In the system disclosed in Patent Document 1, only a specific door (a door for which the user has operated the operation unit) is unlocked if the user operates the operation unit provided in the door of the vehicle. However, in Patent Document 1, a configuration in which only a specific door is unlocked if the user operates an operation unit (unlocking button) in a communication device is not considered.

The present system has been made in view of the foregoing situation. An object of the present system is to provide a door unlocking system that does not have a complicated configuration and also enables only a specific door to be unlocked if a user operates an operation unit of a communication device.

A potential feature of a door unlocking system according to one aspect lies in including an operation unit for being subjected to an operation related to unlocking of a door of a vehicle provided with a plurality of doors, a communication device having a transmission unit for wirelessly transmitting an operation signal if the operation unit has been operated, a wireless reception unit for wirelessly receiving the operation signal transmitted from the communication device, and a door unlocking device for unlocking the door if the wireless reception unit receives the operation signal, the door unlocking system further comprising a detection unit for detecting presence of the communication device in detection regions that are respectively associated with each one or more of the doors, wherein, when the wireless reception unit receives the operation signal in a case where the detection unit has detected presence of the communication device, the door unlocking device is configured to unlock only a door that is associated with a detection region in which the communication device is present.

According to another aspect, if the operation unit provided in the communication device is operated, the communication device wirelessly transmits the operation signal. Furthermore, the detection unit detects the presence of the communication device in the detection regions that are associated respectively with the one or more of the doors provided in the vehicle. When the wireless reception unit mounted in the vehicle receives the operation signal transmitted from the communication device in the case where the presence of the communication device has been detected, the door that corresponds to the detection region in which the communication device is present is unlocked. Accordingly, the user who carries the communication device can unlock only a specific door (the door that the user has approached) by operating the operation unit of the communication device within the detection region associated with any of the doors, specifically by operating the operation unit of the communication device in a state of having approached any of the doors. Therefore, a suspicious person who is hiding on the opposite side of the vehicle can be prevented from entering the vehicle from other doors by unlocking only the door that the user has approached.

A potential feature of a door unlocking system lies in that, when the wireless reception unit has received the operation signal in a case where the detection unit has not detected presence of the communication device, the door unlocking device is configured to unlock all doors.

According to another aspect, when the wireless reception unit mounted in the vehicle receives the operation signal transmitted from the communication device in the case where the presence of the communication device has not been detected, all doors are unlocked. Accordingly, the user who carries the communication device can unlock all doors by operating the operation unit of the communication device outside the detection regions associated with the respective doors, specifically by operating the operation unit of the communication device at a distance from the doors (vehicle). Therefore, by unlocking all doors, excellent operability is achieved when a plurality of passengers get into the vehicle from a plurality of doors.

Furthermore, the user who carries the communication device can switch the door to be unlocked by switching between operating the operation unit of the communication device in a state of having approached a door of the vehicle and operating the operation unit of the communication device in a state of being distant from the vehicle. By thus changing the timing of operating the operation unit of the communication device, the user can choose to unlock only a specific door (the door that the user has approached) or to unlock all doors.

A potential feature of the door unlocking system lies in further including: one or a plurality of wireless transmission units for wirelessly transmitting a signal, each of the wireless transmission units being associated with one or more of the doors, wherein the detection unit has a check signal transmission unit for transmitting a check signal with each of the wireless transmission units, and is configured to determine whether or not the communication device is present in accordance with whether or not a response signal in response to the transmitted check signals has been received by the wireless reception unit, and the communication device has: a reception unit for wirelessly receiving the check signals transmitted from the wireless transmission units; and a response signal transmission unit for transmitting, if the reception unit has received the check signal, a response signal in response to the received check signal with the transmission unit.

According to another aspect, the wireless transmission units associated respectively with one or more of the doors of the vehicle each transmit the check signal, and if the communication device receives this check signal, the communication device transmits the response signal in response to the received check signal. It is determined whether or not the communication device is present in the detection regions associated with the respective doors in accordance with whether or not the wireless reception unit mounted in the vehicle has received the response signal in response to the check signal transmitted by each wireless transmission unit. Accordingly, the door associated with the wireless transmission unit that has transmitted the check signal corresponding to the received response signal is unlocked.

A potential feature of the door unlocking system lies in that the detection unit further has an identification unit for identifying, if the response signal has been received with the wireless reception unit, a wireless transmission unit that has transmitted the check signal corresponding to the received response signal, and determines that the communication device is present in a detection region that is associated with a door corresponding to the identified wireless transmission unit.

According to another aspect, if the wireless reception unit receives the response signal, the wireless transmission unit that has transmitted the check signal corresponding to the received response signal is identified, and it is determined that the communication device is present in the detection region associated with the identified wireless transmission unit. Accordingly, by providing the wireless transmission unit at an appropriate location for each door, the area in which the check signal transmitted from the corresponding wireless transmission unit can be received can be set as the detection region associated with the corresponding door for detecting the presence of the communication device. With this configuration, it is easy to detect the detection region in which the communication device is present.

A potential feature of the door unlocking system lies in that the transmission unit of the communication device and the wireless reception unit are configured to transmit and receive a wireless signal in a UHF (Ultra High Frequency) band, and the wireless transmission units and the reception unit of the communication device are configured to transmit and receive a wireless signal in an LF (Low Frequency) band.

According to another aspect, the wireless transmission units each transmit the check signal as the wireless signal in the LF band to the communication device, and the communication device transmits the response signal in response to the received check signal as the wireless signal in the UHF band to the wireless reception unit. The configuration in which the wireless signal in the LF band is transmitted from the vehicle (wireless transmission unit) to the communication device, and the wireless signal in the UHF band is transmitted from the communication device to the vehicle (wireless reception unit) is similar to that of conventional door locking systems. Accordingly, an increase in costs can be avoided by detecting the presence of the communication device using this conventional configuration.

A potential feature of the door unlocking system lies in that the communication device further has a notification unit for giving notification if the check signal transmitted by any of the wireless transmission units has been received by the reception unit.

According to another aspect, if the communication device has received the check signal transmitted by any of the wireless transmission units, the communication device gives notification that the communication device has entered any of the detection regions, i.e., the user has approached any of the doors. For example, a notification function such as a lamp or a buzzer is provided in the communication device, and notification is given by turning on or blinking the lamp or sounding the buzzer, for example. Accordingly, the user can determine the timing of operating the operation unit of the communication device.

A potential feature of the door unlocking system lies in further including: a notification unit for giving, if the door unlocking device unlocks a door, notification in a mode that depends on the unlocked door.

According to another aspect, if a door is unlocked, the notification unit mounted in the vehicle gives notification in a mode that depends on the unlocked door. For example, if all doors are unlocked, a hazard lamp of the vehicle is blinked twice, and if only a specific door is unlocked, the hazard lamp is blinked three times, thus giving the notification. Accordingly, the user can understand the unlocked door in accordance with the notification mode.

A potential feature of the door unlocking system lies in that the detection unit is configured to detect presence of the communication device at least for a detection region that is associated with a door on a rear seat side.

According to another aspect, the detection unit detects the presence of the communication device in at least the detection region associated with the door on the rear seat side. Accordingly, the user who carries the communication device can unlock only the door on the rear seat side by approaching the door on the rear seat side and operating the operation unit of the communication device.

A potential feature of the door unlocking system lies in further including a vehicle-side operation unit for being subjected to an operation related to unlocking of a door of the vehicle, the vehicle-side operation unit being provided in an outer surface of the vehicle, wherein, when the vehicle-side operation unit has been operated in a case where the detection unit has detected presence of the communication device, the door unlocking device is configured to unlock all doors.

According to another aspect, the vehicle-side operation unit for being subjected to an operation related to unlocking of doors of the vehicle is provided in the outer surface of the vehicle, and all doors are unlocked when the vehicle-side operation unit is operated in the case where the detection unit has detected the presence of the communication device. Accordingly, the user who carries the communication device can unlock all doors by operating the vehicle-side operation unit provided in the vehicle. Furthermore, the user who carries the communication device can switch the door to be unlocked by switching between operating the operation unit of the communication device in a state of having approached a door of the vehicle and operating the vehicle-side operation unit of the vehicle. By thus changing the operation unit to be operated, it is possible to choose to unlock only a specific door (the door that the user has approached) or to unlock all doors.

According to another aspect, it is possible to unlock only a specific door (the door that a user has approached) by the user operating an operation unit of a communication device in a state of having approached the door of a vehicle. Therefore, a suspicious person who is hiding on the opposite side of the vehicle can be prevented from entering the vehicle from other doors by unlocking only the door that the user has approached.

DESCRIPTION OF EMBODIMENTS

Hereinafter, a door unlocking system according to one aspect will be described in detail based on the drawings showing exemplary embodiments where the invention is applied to a door locking system.

Embodiment 1

Figure 1:
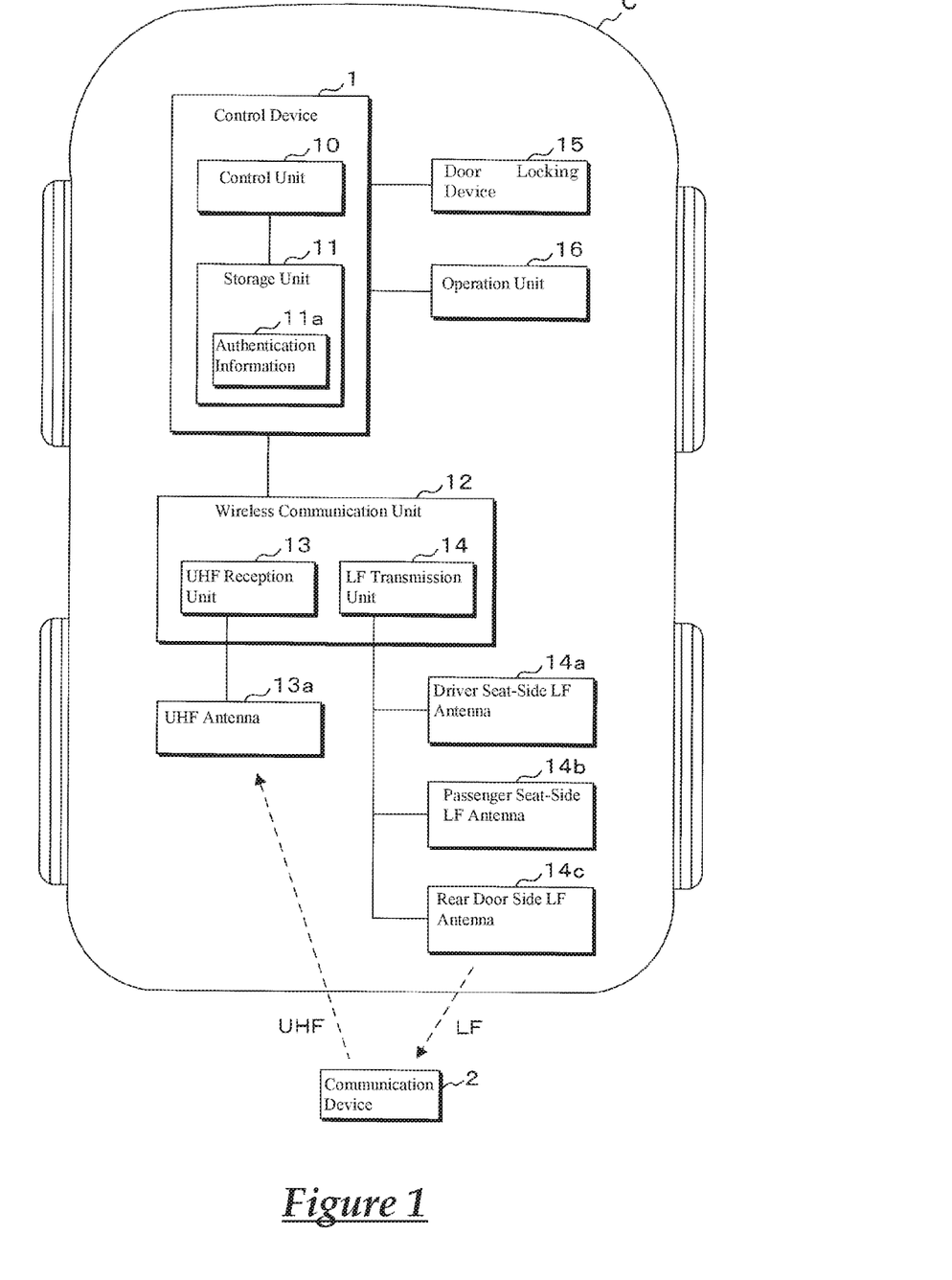
FIG. 1 is a block diagram showing a configuration of a door locking system according to Embodiment 1.

A door locking system according to Embodiment 1 will be described below. FIG. 1 is a block diagram showing a configuration of a door locking system according to Embodiment 1. The door locking system according to Embodiment 1 includes various in-vehicle devices, such as a door locking device 15 that is mounted in a vehicle C and a control device 1 that controls operations of the door locking device 15, and a communication device 2. Note that, in FIG. 1, the details of the in-vehicle devices mounted in the vehicle C are shown.

A wireless communication unit 12, the door locking device 15, an operation unit 16, and the like are mounted in the vehicle C, and these parts are connected to the control device 1.

The control device 1 has a control unit 10 such as a CPU (Central Processing Unit) or an MPU (Micro Processor Unit), a storage unit 11 such as an EEPROM (Electrically Erasable Programmable Read Only Memory) or a flash memory, and the like. The storage unit 11 stores various kinds of data such as control programs that are executed by the control unit 10 and authentication information 11a, data that is generated when the control programs are executed by the control unit 10, and the like. The control device 1 controls operations of the aforementioned devices by the control unit 10 loading and executing the control programs stored in the storage unit 11, and operates as the door unlocking system according to one aspect. The authentication information 11a is unique identification information that is associated with the vehicle C, and is stored in advance in the storage unit 11.

The door locking device 15 includes a mechanism for locking and unlocking doors of the vehicle C, a power source for operating this mechanism, such as a motor or an actuator, a drive circuit that drives this power source, and the like. The door locking device (door unlocking device) 15 locks and unlocks doors of the vehicle C by causing the drive circuit to operate in accordance with an instruction from the control device 1. Note that the vehicle C is provided with doors (not shown) at four locations, namely on the driver seat side, the passenger seat side, the rear seat side behind the driver seat, and the rear seat side behind the passenger seat, for example. A rear door (not shown) is provided on the rear side. The door locking device 15 is provided in each door, and each door can be locked or unlocked by the control device 1 giving an instruction to lock or unlock the door to the corresponding door locking device 15. Note that the door locking system according to Embodiment 1 is configured to unlock any one of the doors or simultaneously unlock all doors when unlocking the doors, and simultaneously lock all doors when locking the doors.

The operation unit 16 has various operation buttons for being subjected to operations related to various devices mounted in the vehicle C. The operation buttons include, for example, a request switch (not shown) provided in the outer surface or the like of a door of the vehicle C for giving an instruction to lock and unlock the doors of the vehicle C. The operation buttons are constituted by press buttons for being subjected to a pressing operation, sensors for being subjected to a contact operation, or the like. If any operation button is operated by the user, the operation button outputs a predetermined signal to the control device 1. Accordingly, the control device 1 can determine the operation button on which the operation has been performed based on the acquired output signal.

The wireless communication unit 12 is for wirelessly communicating with the communication device 2 in accordance with an instruction from the control device 1, and has a UHF reception unit 13 and an LF transmission unit 14.

A UHF antenna 13a, which is provided at an appropriate location in the vehicle C, is connected to the UHF reception unit 13. The UHF reception unit (wireless reception unit) 13 is for receiving a wireless signal in a UHF band (e.g., 315 MHz), and receives a signal transmitted as a wireless signal in the UHF band via the UHF antenna 13a. The UHF reception unit 13 receives a signal that is transmitted from an external device (e.g., the communication device 2) located in a communicable area (e.g., an area of several dozen meters from the UHF antenna 13a), and sends the received signal to the control device 1.

Three LF antennas 14a to 14c, which are provided at respective appropriate locations in the vehicle C, are connected to the LF transmission unit 14. All LF antennas 14a to 14c are the same antennas. The LF transmission unit (wireless transmission unit) 14 is for transmitting a wireless signal in an LF band (e.g., 125 kHz), and transmits a signal given from the control device 1 as a wireless signal in the LF band via all of the LF antennas 14a to 14c. The signal transmitted from the LF transmission unit 14 is received by an external device (e.g., the communication device 2)

located in a communicable area (e.g., an area of about a meter from the LF antennas 14a to 14c).

Figure 2:
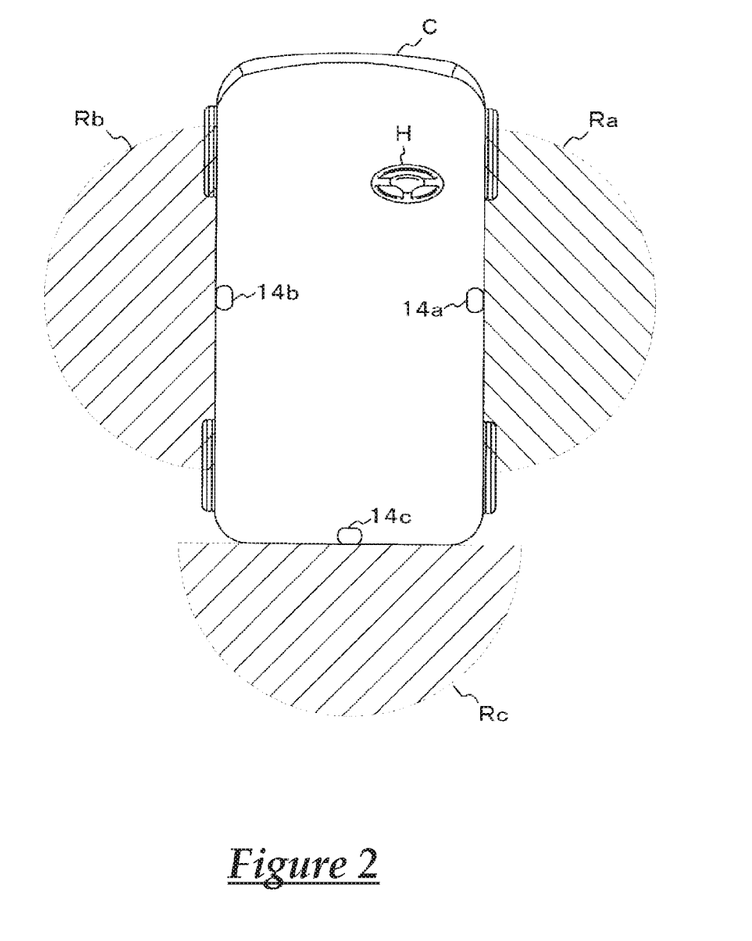
FIG. 2 is a schematic diagram showing exemplary installation positions of LF antennas.

FIG. 2 is a schematic diagram showing exemplary installation positions of the LF antennas 14a to 14c. In FIG. 2, the vehicle C is shown with the front part of the vehicle C on the upper side. The vehicle C shown in FIG. 2 has a driver seat (steering wheel H) on the right side relative to the travelling direction. As shown in FIG. 2, in Embodiment 1, a single LF antenna is provided between the two doors on the right side relative to the travelling direction of the vehicle C, e.g., in a B pillar. This LF antenna will be referred to as the driver seat-side LF antenna 14a. A single LF antenna is also provided between the two doors on the left side relative to the travelling direction of the vehicle C, e.g., in the B pillar. This LF antenna will be referred to as the passenger seat-side LF antenna 14b. Furthermore, a single LF antenna is also provided on the rear side of the vehicle C, e.g., at the center of the rear door. This LF antenna will be referred to as the rear door-side LF antenna 14c. In FIG. 2, hatched regions Ra, Rb, and Rc are areas that signals transmitted respectively from the LF antennas 14a to 14c reach, i.e., communicable areas. Accordingly, signals transmitted via the LF antennas 14a to 14c are received respectively by an external device (e.g., the communication device 2) located in the regions Ra, Rb, and Rc. Note that the regions Ra, Rb, and Rc are set so as not to overlap one another.

Although the door locking system according to Embodiment 1 has a configuration in which the wireless communication unit 12 is connected to the control device 1, a configuration in which the functionality of the wireless communication unit 12 is incorporated in the control device 1 may also be employed.

Figure 3:
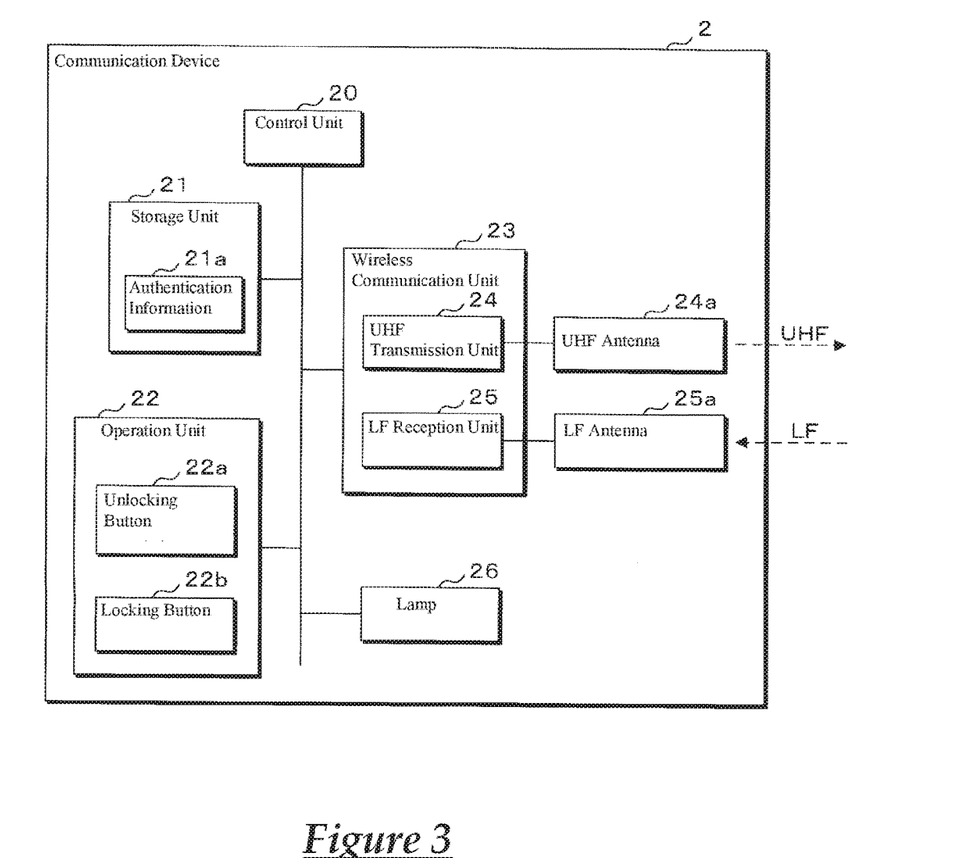
FIG. 3 is a block diagram showing a configuration of a communication device according to Embodiment 1.

FIG. 3 is a block diagram showing a configuration of the communication device 2 according to Embodiment 1. The communication device 2 in the door locking system according to Embodiment 1 is a portable wireless communication device that is configured in a card shape or a key chain shape. The communication device 2 includes a control unit 20, a storage unit 21, an operation unit 22, a wireless communication unit 23, a lamp 26, and the like, which are connected to one another.

The control unit 20 is a CPU or an MPU, for example. The control unit 20 operates as the communication device 2 by loading and executing control programs stored in the storage unit 21. The storage unit 21 is an EEPROM, a flash memory, or the like, for example. The storage unit 21 stores various kinds of data such as control programs that are executed by the control unit 20 and authentication information 21a, data that is generated when the control programs are executed by the control unit 20, and the like. The authentication information 21a is unique identification information that is associated with the vehicle C, which can be operated by the communication device 2, and is stored in advance in the storage unit 21.

The operation unit 22 has a plurality of operation buttons for being subjected to operations related to various devices mounted in the vehicle C, such as an unlocking button 22a for giving an instruction to unlock the doors of the vehicle C, and a locking button 22b for giving an instruction to lock the doors. If any of the operation buttons is operated, the operation unit 22 outputs a signal that corresponds to the operated operation button to the control unit 20. The control unit 20 can determine the operation button that has been operated based on the output signal from the operation unit 22.

The wireless communication unit 23 is for wirelessly communicating with the control device 1 (specifically, the wireless communication unit 12) in accordance with an instruction from the control unit 20, and has a UHF transmission unit 24 and an LF reception unit 25.

A UHF antenna 24a, which is provided at an appropriate location in the communication device 2, is connected to the UHF transmission unit 24. The UHF transmission unit (transmission unit) 24 is for transmitting a wireless signal in the UHF band, and transmits a signal given from the control unit 20 as a wireless signal in the UHF band via the UHF antenna 24a. The signal transmitted from the UHF transmission unit 24 is received by an external device (e.g., the UHF reception unit 13 of the wireless communication unit 12) located in a communicable area (e.g., an area of several dozen meters from the UHF antenna 24a).

An LF antenna 25a, which is provided at an appropriate location in the communication device 2, is connected to the LF reception unit 25. The LF reception unit (reception unit) 25 is for receiving a wireless signal in the LF band, and receives, via the LF antenna 25a, a signal transmitted as a wireless signal in the LF band. The LF reception unit 25 receives a signal transmitted from an external device (e.g., the LF transmission unit 14 in the wireless communication unit 12) located in a communicable area (e.g., an area of about a meter from the LF antenna 25a), and sends the received signal to the control unit 20.

The lamp 26 is configured using an LED (Light Emitting Diode) or the like, for example, and is subjected to control for turning on and off by the control unit 20. The lamp 26 can be blinked by the control unit 20 cyclically repeating the turning on and off of the lamp 26. Various notifications for the user who carries the communication device 2 can be given by the control unit 20 turning on and blinking the lamp 26.

A description will be given below of processing that is performed by the control device 1 and the communication device 2 in the door locking system according to Embodiment 1 having the above-described configuration. In the door locking system according to Embodiment 1, if the user operates (performs a pressing operation on) the unlocking button 22a of the communication device 2, the door to be unlocked is different depending on whether or not the user (communication device 2) is present in any of the regions Ra, Rb, and Rc at this time point. Specifically, if the user is present in any of the regions Ra, Rb, and Rc at the time point of operating the unlocking button 22a, only the door that corresponds to the region Ra (or Rb or Rc) where the user (communication device 2) is present is unlocked. Note that, in Embodiment 1, only the door on the driver seat side is unlocked if the user is present in the region Ra. Only the door on the passenger seat side is unlocked if the user is present in the region Rb. Only the rear door is unlocked if the user is present in the region Rc. On the other hand, if the user is not present in any of the regions Ra, Rb, and Rc at the time point of operating the unlocking button 22a, all doors are unlocked.

Figure 4:
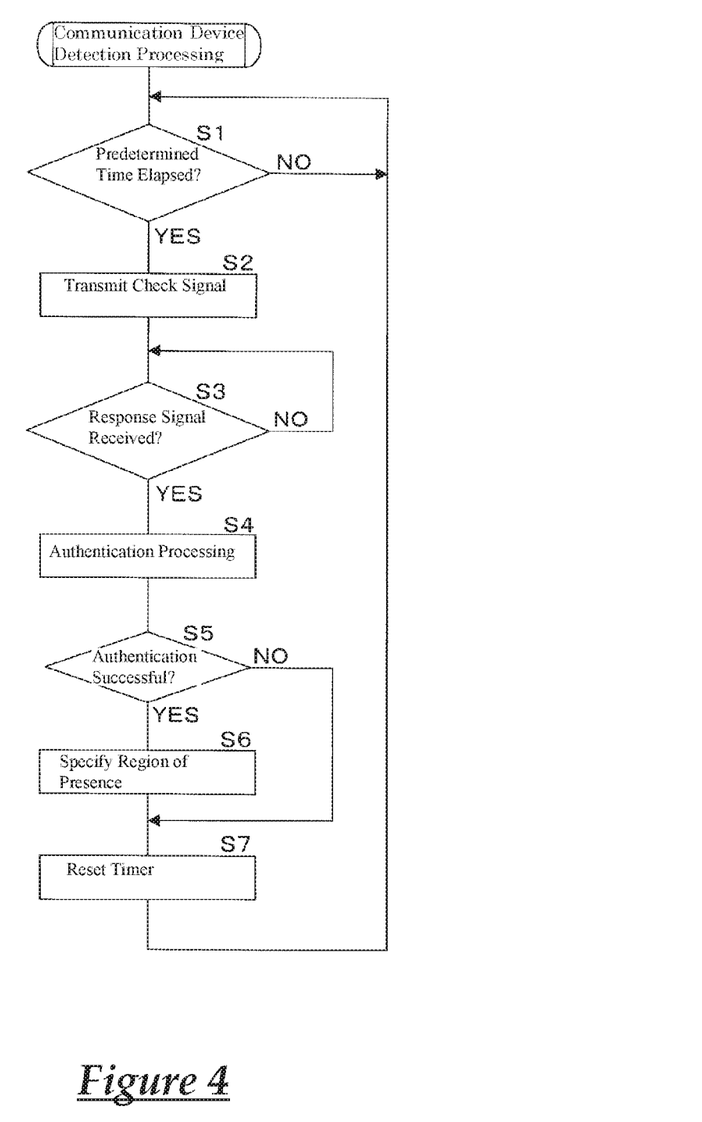
FIG. 4 is a flowchart showing a procedure of communication device detection processing performed by a control device.

Accordingly, the control device 1 regularly performs processing for detecting the presence of the communication device 2 for each of the regions Ra, Rb, and Rc. Communication device detection processing performed by the control device 1 will be described below. FIG. 4 is a flowchart showing a procedure of the communication device detection processing performed by the control device 1. Note that the control device 1 performs the following processing if the doors of the vehicle C are in a locked state. The control device 1 transmits the check signal via the LF antennas 14a to 14c at predetermined timings (on a regular basis), and determines whether or not a predetermined time has elapsed based on a timer for measuring (clocking) a check signal transmission timing (S1). If it is determined that the predetermined time has not elapsed (S1: NO), the control device 1 stands by until the predetermined time elapses.

If it is determined that the predetermined time has elapsed (S1: YES), the control device (check signal transmission unit) 1 transmits, with the LF transmission unit 14 of the wireless communication unit 12, wireless signals (check signals) in the LF band respectively via the LF antennas 14a to 14c (S2). Note that each check signal includes the authentication information 11a stored in the storage unit 11, and antenna information that indicates the corresponding one of the LF antennas 14a to 14c. The check signals transmitted respectively from the LF antennas 14a to 14c are received by the LF reception unit 25 of the communication device 2 if the communication device 2 is present in the respective communicable areas (the regions Ra, Rb, and Rc) of the LF antennas 14a to 14c.

After finishing the transmission of the check signals, the control device 1 determines whether or not the response signal (a wireless signal in the UHF band) transmitted from the communication device 2 has been received by the UHF reception unit 13 of the wireless communication unit 12 (S3). If it is determined that the response signal has not been determined (S3: NO), the control device 1 stands by until reception.

If it is determined that the response signal has been received by the UHF reception unit 13 (S3: YES), the control device 1 performs authentication processing for determining whether or not the received response signal is a signal transmitted from a valid communication device 2 (i.e., a communication device 2 that is associated with the vehicle C) (S4). Note that the response signal transmitted from the communication device 2 includes the authentication information 21a stored in the storage unit 21 of the communication device 2, and the control device 1 compares the authentication information 21a included in the received response signal with the authentication information 11a stored in the storage unit 11. If the authentication information 21a included in the response signal coincides with the authentication information 11a, the control device 1 determines that the authentication information 21a included in the response signal is valid and the response signal is a response signal from a valid communication device 2 (authentication successful).

The control device 1 determines whether or not the authentication processing has been successful (S5), and if it is determined that the authentication processing has been successful (S5: YES), the control device 1 identifies the region Ra, Rb, or Rc in which the communication device 2 is present (S6). Note that the response signal transmitted from the communication device 2 also includes the antenna information included in the check signal that has been received by the communication device 2 with the LF reception unit 25, and the control device 1 identifies the region Ra, Rb, or Rc in which the communication device 2 is present based on the antenna information included in the received response signal. Specifically, the control device 1 identifies, from the antenna information, which of the LF antennas 14a to 14c is an LF antenna from which the check signal has been transmitted, and identifies the region Ra (or Rb or Rc) that corresponds to the identified LF antenna 14a (or 14b or 14c). For example, if the antenna information is information that indicates the LF antenna 14a, the control device 1 identifies the region Ra as the region in which the communication device 2 is present. In the case of the LF antenna 14b, the control device 1 identifies the region Rb as that region. In the case of the LF antenna 14c, the control device 1 identifies the region Rc as that region.

If it is determined that the authentication processing has not been successful (S5: NO), the control device 1 skips processing in step S6. Note that the cases where the authentication fails include the case that the authentication information included in the received response signal is not valid, as well as the case that no response signal has been received, or that the authentication information is not included in the received response signal, for example.

The control device 1 resets the timer for measuring (clocking) the check signal transmission timing (S7), and returns to the processing in step S1.

Through the above-described processing, the control device 1 can detect the region Ra, Rb, or Rc in which the communication device 2 is present. Furthermore, the control device 1 can detect the region in which the communication device 2 is present in real-time by regularly repeating the above-described processing.

Note that, in the above-described processing, the control device 1 includes the antenna information that indicates one of the LF antennas 14a to 14c in the check signal and transmits this check signal, and the communication device 2 includes the antenna information included in the received check signal in the response signal and transmits (replies) this response signal. Thus, the control device 1 can determine from which of the LF antennas 14a to 14c the check signal received by the communication device 2 has been transmitted, and determines, as a result, the region in which the communication device 2 is present. In addition, for example, a configuration may also be employed in which the antenna information is not included in the check signal, the control device 1 transmits the check signals that include the authentication information 11a at different timings respectively via the LF antennas 14a to 14c, and if the control device 1 receives a response signal that corresponds to any of the transmitted check signals, the control device 1 determines that the communication device 2 is present in the region Ra (or Rb or Rc) that corresponds to the LF antenna 14a (or 14b or 14c) that has transmitted this check signal.

Figure 5:
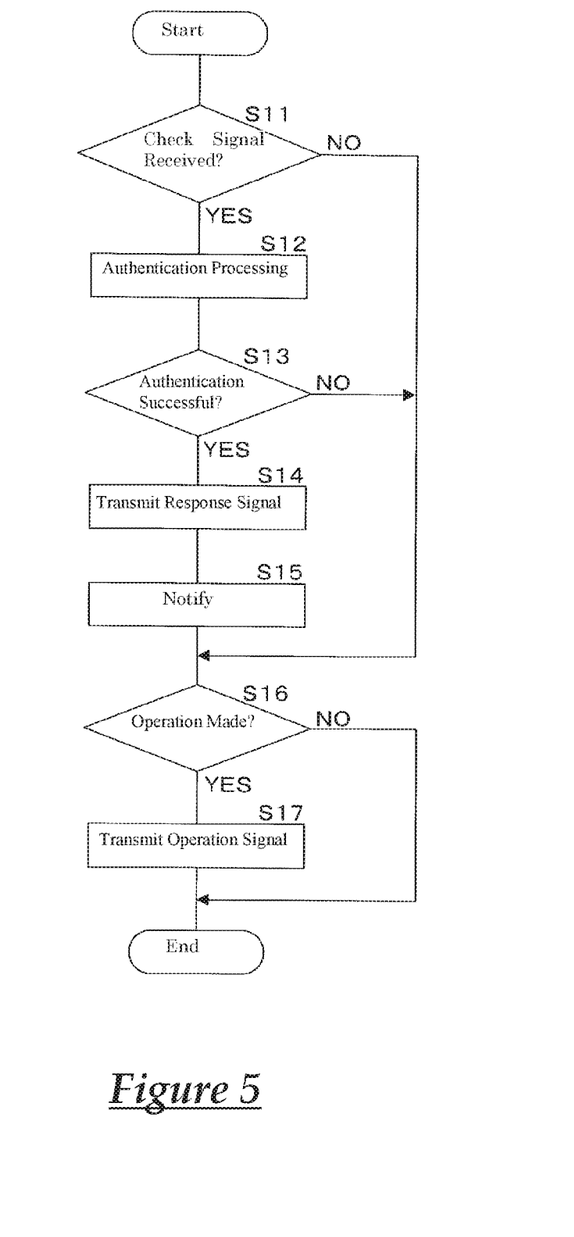
FIG. 5 is a flowchart showing a procedure performed by the communication device.

Next, a description will be given of door unlocking processing performed in the door locking system according to Embodiment 1. First, processing performed by the communication device 2 will be described. FIG. 5 is a flowchart showing a procedure of the processing performed by the communication device 2. The control unit 20 of the communication device 2 determines whether or not a check signal transmitted as a wireless signal in the LF band has been received by the LF reception unit 25 of the wireless communication unit 23 from an external device (specifically, the control device 1) (S11). If it is determined that the check signal has not been received (S11: NO), the control unit 20 advances the processing to step S16. Specifically, the control unit 20 determines whether or not the check signal that has been transmitted by the control device 1 in step S2 in FIG. 4 has been received.

If it is determined that the check signal has been received by the LF reception unit 25 (S11: YES), the control unit 20 of the communication device 2 performs authentication processing for determining whether or not the received check signal is a signal that has been transmitted from a valid control device 1 (S12). Note that each check signal transmitted from the control device 1 includes the authentication information 11a stored in the storage unit 11 of the control device 1, and the antenna information that indicates the corresponding one of the LF antennas 14a to 14c. The control unit 20 of the communication device 2 compares the authentication information 11*a* included in the received check signal with the authentication information 21*a* stored in the storage unit 21. If the authentication information 11*a* included in the check signal coincides with the authentication information 21*a*, the control unit 20 of the communication device determines that the authentication information 11*a* included in the check signal is valid and the check signal is a check signal from a valid control device 1 (authentication successful).

The control unit 20 of the communication device 2 determines whether or not the authentication processing has been successful (S13). If it is determined that the authentication processing has been successful (S13: YES), the control unit 20 transmits, with the wireless communication unit 23, a response signal that includes the authentication information 21*a* stored in the storage unit 21 and the antenna information included in the received check signal (S14). Note that the control unit (response signal transmission unit) 20 transmits the response signal as a wireless signal in the UHF band with the UHF transmission unit 24 of the wireless communication unit 23 via the UHF antenna 24*a*. The response signal transmitted in step S14 is received by the control device 1 in step S3 in FIG. 4. The control unit 20 turns on or blinks the lamp (notification unit) 26, and gives notification that the communication device 2 (the user who carries the communication device 2) has entered any of the regions Ra, Rb, or Rc (S15). If it is determined that the authentication processing has not been successful (S13: NO), the control unit 20 of the communication device 2 advances the processing to step S16. Note that the cases where the authentication fails include the case that that authentication information included in the received check signal is not valid, as well as the case that the authentication information is not included in the received signal, for example.

On the other hand, the control unit 20 of the communication device 2 determines whether or not the user has operated the unlocking button 22*a*, in accordance with whether or not the predetermined signal is acquired from the operation unit 22 (S16). If it is determined that the user has operated the unlocking button 22*a* (S16: YES), the control unit 20 of the communication device 2 transmits, with the wireless communication unit 23, an operation signal that includes the authentication information 21*a* stored in the storage unit 21 and operation information indicating that an operation has been made on the unlocking button 22*a* (S17). Note that the control unit 20 transmits the operation signal as a wireless signal in the UHF band with the UHF transmission unit 24 of the wireless communication unit 23 via the UHF antenna 24*a*. If it is determined that the user has not operated the unlocking button 22*a* (S16: NO), the control device 1 ends the processing.

The control unit 20 of the communication device 2 performs the above-described processing every time the check signal is received by the LF reception unit 25 of the wireless communication unit 23, or every time the user operates the unlocking button 22*a* of the operation unit 22. Thus, the communication device 2 can reply the response signal in response to the check signal that is regularly transmitted from the control device 1, and can notify the control device 1 that the user has operated the unlocking button 22*a*.

Figure 6:
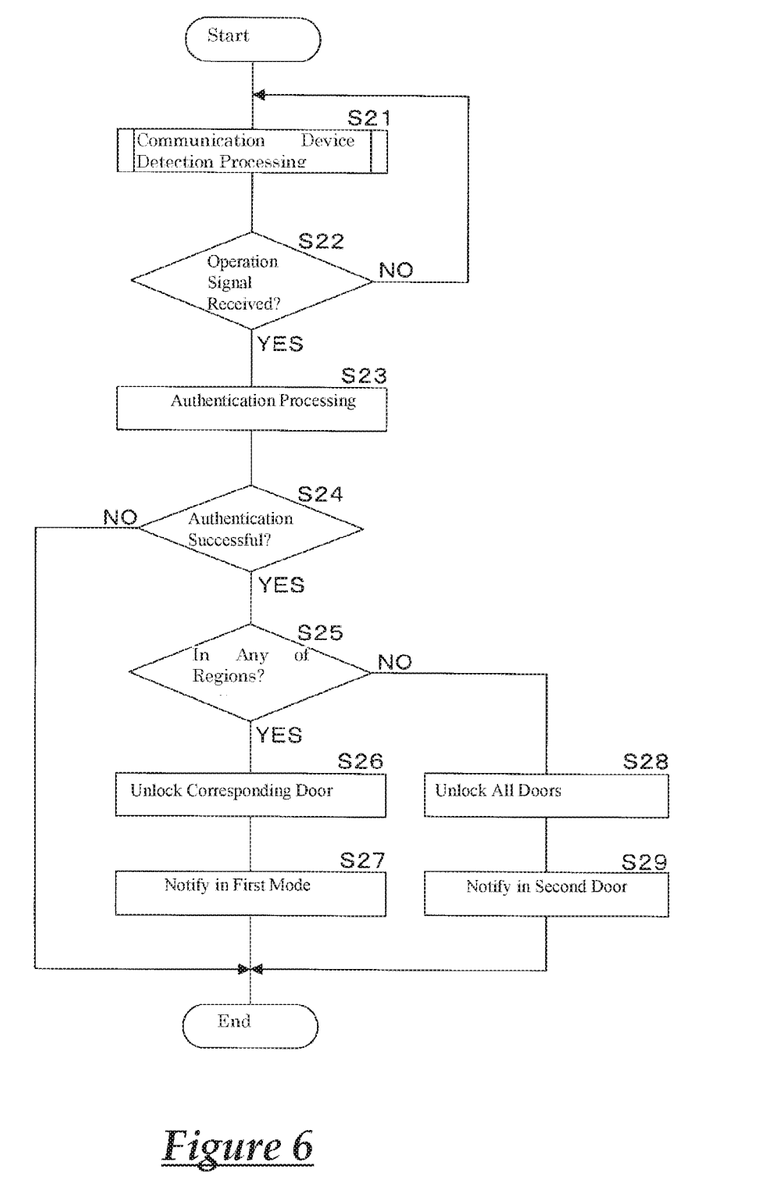
FIG. 6 is a flowchart showing a procedure of door unlocking processing performed by the control device.

Next, the processing performed by the control device 1 will be described. FIG. 6 is a flowchart showing a procedure of door unlocking processing performed by the control device 1. Note that the control device 1 performs the following processing if the doors of the vehicle C are in a locked state. The control device (detection unit) 1 performs the communication device detection processing shown in FIG. 4 (S21), and determines whether the communication device 2 is present in any of the regions Ra, Rb, and Rc, or whether the communication device 2 is not present in any of the regions Ra, Rb, and Rc. The control device 1 also determines whether or not the operation signal transmitted as the wireless signal in the UHF band has been received with the UHF reception unit 13 of the wireless communication unit 12 from the communication device 2 (S22). Specifically, the control device 1 determines whether or not the operation signal transmitted by the communication device 2 in step S17 in FIG. 5 has been received. If it is determined that the operation signal has not been received (S22: NO), the control device 1 returns to the processing in step S21.

If it is determined that the operation signal has been received at the UHF reception unit 13 (S22: YES), the control device 1 performs authentication processing for determining whether or not the received operation signals is a signal transmitted from a valid communication device 2 (i.e., a communication device 2 that is associated with the vehicle C) (S23). Note that the authentication information 21*a* stored in the storage unit 21 of the communication device 2 is included in the operation signal transmitted from the communication device 2. If the authentication information 21*a* included in the operation signal coincides with the authentication information 11*a* stored in the storage unit 11, the control device 1 determines that the authentication information 21*a* included in the operation signal is valid, and the operation signal is a signal from a valid communication device 2 (authentication successful).

The control device 1 determines whether or not the authentication processing has been successful (S24). If it is determined that the authentication has been unsuccessful (S24: NO), the control device 1 ends the processing.

If it is determined that the authentication processing has been successful (S24: YES), the control device 1 determines whether or not the communication device 2 is present in any of the regions Ra, Rb, and Rc based on a processing result of the communication device detection processing performed in step S21. (S25). Specifically, it is determined whether or not the presence region identified by the control device 1 in step S6 in FIG. 4 is any of the regions Ra, Rb, and Rc. If it is determined that the communication device 2 is present in any of the regions Ra, Rb, and Rc (S25: YES), the control device 1 controls the door locking device 15, and unlocks the door that corresponds to the region Ra (or Rb or Rc) in which the communication device 2 is present (S26). Specifically, if the communication device 2 is present in the region Ra, the door on the driver seat side is unlocked. If the communication device 2 is present in the region Rb, the door on the passenger seat side is unlocked. If the communication device 2 is present in the region Rc, the rear door is unlocked.

If one of the doors (i.e., a specific door) is unlocked, for example, the control device (notification unit) 1 blinks a hazard lamp (not shown) in a first mode, gives notification that the specific door has been unlocked (S27), and ends the processing. On the other hand, if it is determined that the communication device 2 is not present in any of the regions Ra, Rb, and Rc (S25: NO), the control device 1 controls the door locking device 15 and unlocks all doors of the vehicle C (S28). Then, for example, the control device 1 blinks the hazard lamp (not shown) in a second mode, gives notification that all doors have been unlocked (S29), and ends the processing. Note that the hazard lamp may be blinked twice in a predetermined time (e.g., two seconds) as a first mode, for example, and the hazard lamp may be blinked twice in a predetermined time (e.g., one second) as a second mode, for example. However, the present invention is not limited to this configuration. For example, the number of times of the blinking of the hazard lamp may be different between the first mode and the second mode.

With the above-described processing, in the door locking system according to Embodiment 1, when the unlocking button 22a is operated while the communication device 2 (the user who carries the communication device 2) is present in a region within a predetermined area from the vehicle C, or specifically, in the region Ra, Rb, or Rc, only the door that corresponds to the region Ra (or Rb or Rc) in which the user is present is unlocked. If the unlocking button 22a is operated while the communication device 2 is not present in any of the regions Ra, Rb, and Rc, all doors are unlocked.

Accordingly, the user can unlock only a specific door by operating the unlocking button 22a of the communication device 2 near the door that the user wants to unlock (specifically, in any of the regions Ra, Rb, and Rc). The user can also unlock all doors by operating the unlocking button 22a of the communication device 2 in a place distant from the vehicle C (specifically, outside the regions Ra, Rb, and Rc).

In the case of unlocking only a specific door (the door that the user has approached), since a suspicious person can be prevented from entering the vehicle C from other doors, the safety can be ensured. Furthermore, in the case of unlocking all doors, excellent operability can be achieved when a plurality of passengers get into the vehicle C from a plurality of doors. Accordingly, the user can switch the door to be unlocked by switching between operating the unlocking button 22a of the communication device 2 in a state of having approached a specific door of the vehicle C and operating the unlocking button 22a of the communication device 2 in a place distant from the vehicle C. By thus changing the timing of operating the unlocking button 22a of the communication device 2, the user can choose to unlock only a specific door (the door that the user has approached) or to unlock all doors. Note that, in the case of unlocking all doors, all of the doors with which people get into the vehicle C need only be unlocked, and for example, a configuration may also be employed in which only four doors, namely the door on the driver seat side, the door on the passenger seat side, and the two doors on the rear seat side are unlocked. That is to say, the rear door, or the rear and a trunk in the case of a vehicle having a trunk may be configured not to be unlocked simultaneously with the four doors.

In the door locking system according to Embodiment 1, the safety is ensured by unlocking only the door on the driver seat side if the communication device 2 (user) is present in the region Ra. However, a configuration may also be employed in which, if the communication device 2 (user) is present in the region Ra, not only the door on the driver seat side but also the door on the rear seat side behind the driver seat are unlocked. Similarly, a configuration may be employed in which, if the communication device 2 (user) is present in the region Rb, not only the door on the passenger seat side but also the door on the rear seat side behind the passenger seat are unlocked. Thus, in the vehicle C, the safety can be ensured by not unlocking a door on the side opposite to the position of the user who operates the unlocking button 22a of the communication device 2 near the vehicle C, i.e., a door in a dead angle.

In the door locking system according to Embodiment 1, the wireless signal is transmitted in the LF band from the control device 1 to the communication device 2, and the wireless signal is transmitted in the UHF band from the communication device 2 to the control device 1. This configuration is similar to that of conventional smart entry systems. Accordingly, the door locking system according to Embodiment 1 has a configuration in which it can be detected whether or not the communication device 2 is present in any of the regions Ra, Rb, and Rc using a conventional configuration, and therefore, the door unlocking system according to one aspect of the present invention can be achieved at a low cost.

In the door locking system according to Embodiment 1, the communication device 2 receives the check signal that has been transmitted with the LF transmission unit 14 mounted in the vehicle C, and if the received check signal is a valid signal, the lamp 26 is turned on or blinked. Thus, the door locking system has a configuration in which the user who carries the communication device 2 is notified that the communication device 2 is in any of the regions Ra, Rb, and Rc, and the user can determine the timing of operating the unlocking button 22a of the communication device 2. Note that the method for the notification may be not only the turning on or the blinking of the lamp 26 but also a configuration in which the notification is given with audio output using a buzzer, a speaker, or the like, a display of a message using a liquid crystal panel, or other methods.

In the door locking system according to Embodiment 1, the control device 1 uses different blinking modes of the hazard lamp depending on whether a specific door is unlocked or all doors are unlocked. This is a configuration in which the user can determine whether a specific door (the door close to the user) is unlocked or all doors are unlocked in accordance with the blinking mode of the hazard lamp. The notification method here may also be not only the blinking of the hazard lamp but also a configuration in which the notification is given with audio output using a buzzer or a speaker mounted in the vehicle C or the like.

Note that, in the door locking system according to Embodiment 1, if the locking button 22b of the operation unit 22 of the communication device 2 is operated when at least a door is in an unlocked state, the control device 1 locks all doors regardless whether or not the communication device 2 is present in any of the regions Ra to Rc. By collectively locking all doors, it is possible to prevent some of the doors from being left unlocked.

The door locking system according to Embodiment 1 may further have a configuration of the conventional smart entry systems in which all doors are locked or unlocked if the user who carries the communication device 2 operates a request switch (vehicle-side operation unit) provided in the outer surface of the vehicle C. In the case of this configuration, if the request switch provided in the vehicle C is operated in a state where the communication device 2 is present in any of the regions Ra, Rb, and Rc, all doors are locked if the doors of the vehicle C are in an unlocked state, and all doors are unlocked if the doors of the vehicle C are in a locked state. As a result of having this configuration, the user can lock and unlock the doors of the vehicle C by operating the request switch of the vehicle C without operating the communication device 2. Furthermore, when the user has approached the vehicle C (when the communication device 2 is present in any of the regions Ra, Rb, and Rc), the user can switch the door to be unlocked by switching between operating the unlocking button 22a of the communication device 2 and operating the request switch of the vehicle C.

Accordingly, the user can choose to unlock only a specific door (the door that the user has approached) or to unlock all doors by changing the button (the unlocking button 22a or the request switch) to operate when the user has approached the vehicle C.

Embodiment 2

Figure 7:
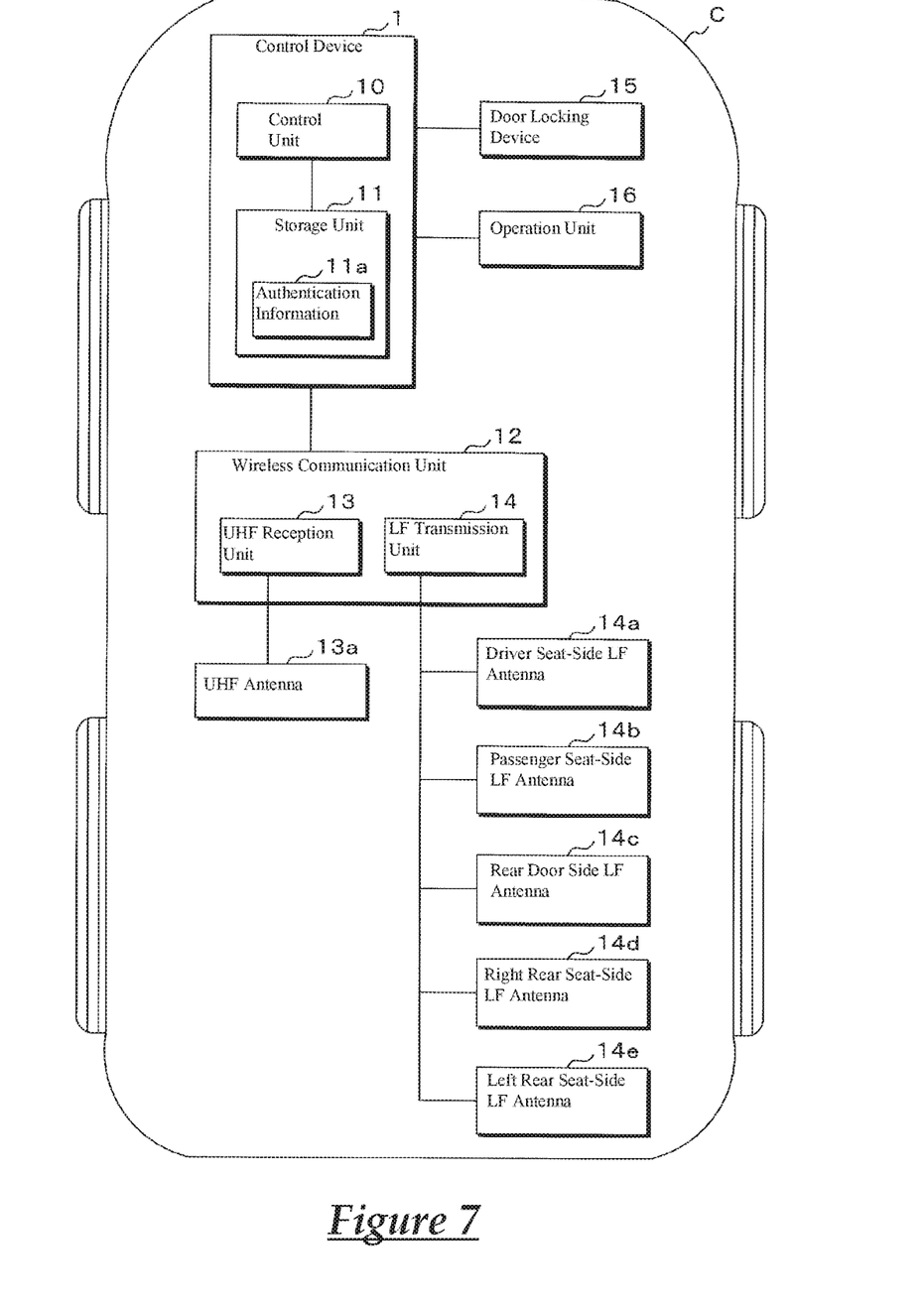
FIG. 7 is a block diagram showing a configuration of a door locking system according to Embodiment 2.

A door locking system according to Embodiment 2 will be described below. FIG. 7 is a block diagram showing a configuration of the door locking system according to Embodiment 2. The door locking system according to Embodiment 2 has a configuration similar to that of the door locking system according to the above-described Embodiment 1, but has five LF antennas 14a to 14e as LF antennas. Note that the LF transmission unit 14 transmits a signal given from the control device 1 as a wireless signal in the LF band via any of the LF antennas 14a to 14e. Since the other configuration of the door locking system according to Embodiment 2 is similar to the configuration of the door locking system according to the above-described Embodiment 1, the same structures will be assigned the same reference signs, and a description thereof will be omitted.

Figure 8:
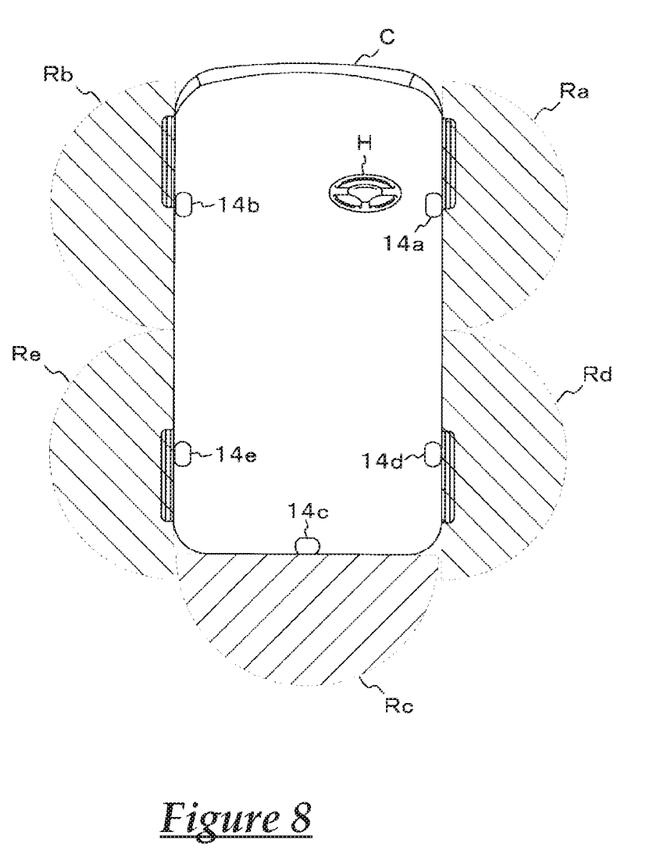
FIG. 8 is a schematic diagram showing exemplary installation positions of LF antennas.

FIG. 8 is a schematic diagram showing exemplary installation positions of the LF antennas 14a to 14e. In FIG. 8, the vehicle C is shown with the front part of the vehicle C on the upper side. The vehicle C shown in FIG. 8 has a driver seat (steering wheel H) on the right side relative to the travelling direction. As shown in FIG. 8, in Embodiment 2, a driver seat-side LF 14a is provided at the center of the door on the driver seat side, a passenger seat-side LF antenna 14b is provided at the center of the door on the passenger seat side, and a rear door-side LF antenna 14c is provided at the center of the rear door. In addition, a right rear seat-side LF antenna 14d is provided at the center of the door on the rear seat side behind the driver seat, and a left rear seat-side LF antenna 14e is provided at the center of the door on the rear seat side behind the passenger seat. In FIG. 8, hatched regions Ra to Re are areas that signals transmitted respectively from the LF antennas 14a to 14e reach, i.e., communicable areas. Accordingly, signals transmitted via the LF antennas 14a to 14e are received by an external device (e.g., the communication device 2) located in the regions Ra to Re. The regions Ra to Re are set so as not to overlap one another.

In the door locking system according to Embodiment 2 having the above-described configuration as well, processing similar to that in the door locking system according to the above-described Embodiment 1 is performed. Note that, in the door locking system according to Embodiment 2, when the unlocking button 22a of the communication device 2 is operated while the communication device 2 is present in any of the regions Ra to Re, the door that corresponds to the region Ra (or any of Rb to Re) in which the communication device 2 is present is unlocked. Specifically, if the communication device 2 is present in the region Ra, the door on the driver seat side is unlocked. If the communication device 2 is present in the region Rb, the door on the passenger seat side is unlocked. If the communication device 2 is present in the region Rc, the rear door is unlocked. If the communication device 2 is present in the region Rd, the door on the rear seat side behind the driver seat is unlocked. If the communication device 2 is present in the region Re, the door on the rear seat side behind the passenger seat is unlocked.

In the door locking system according to Embodiment 2 as well, effects similar to those of the door locking system according to the above-described Embodiment 1 are achieved. Furthermore, a change and addition of each configuration that has been described as appropriate in the above-described Embodiment 1 can also be applied to Embodiment 2.

Note that the door locking system according to Embodiment 2 is not limited to the configuration in which the five LF antennas 14a to 14e are provided in the vehicle C, and may also have a configuration in which at least the right rear seat-side LF antenna 14d and the left rear seat LF antenna 14e are provided respectively on the doors on the two rear seat sides.

The embodiments disclosed at this time are examples in all aspects, and are to be considered to be not restrictive. The scope of the present invention is indicated not by the above-state meanings but by the scope of claims, and is intended to include all modifications within the meanings and scope equivalent to the scope of claims.

LIST OF REFERENCE NUMERALS

1 Control device (check signal transmission unit, detection unit, and notification unit)
2 Communication device
12 Wireless communication unit
13 UHF reception unit (wireless reception unit)
14 LF transmission unit (wireless transmission unit)
15 Door locking device (door unlocking device)
20 Control unit (response signal transmission unit)
22 Operation unit
23 Wireless communication unit
24 UHF transmission unit (transmission unit)
25 LF reception unit (reception unit)
26 Lamp (notification unit)
22a Unlocking button
C Vehicle

The invention claimed is:
1. A door unlocking system including:
an operation unit for being subjected to an operation related to unlocking one or more doors of a vehicle provided with a plurality of doors;
a portable wireless communication device having the operation unit and a transmission unit for wirelessly transmitting an operation signal if the operation unit has been operated;
a wireless reception unit mounted on the vehicle for wirelessly receiving the operation signal transmitted from the transmission unit of the portable wireless communication device, the transmission unit of the portable wireless communication device and the wireless reception unit of the vehicle are configured to transmit and/or receive the operation signal over a UHF (Ultra High Frequency) band;
a door unlocking device mounted on the vehicle for unlocking the one or more doors if the wireless reception unit of the vehicle receives the operation signal; and
a detection unit mounted on the vehicle for detecting a presence of the portable wireless communication device in one or more detection regions that are respectively associated with the one or more doors, the detection unit of the vehicle is configured to detect the presence of the portable wireless communication device over a LF (Low Frequency) band;
wherein, when the wireless reception unit of the vehicle receives the operation signal from the transmission unit of the portable wireless communication device and the detection unit of the vehicle detects the presence of the portable wireless communication device in one of the detection regions, the door unlocking device of the vehicle is configured to unlock only the one door that is associated with the one detection region in which the portable wireless communication device is present; and wherein, when the wireless reception unit of the vehicle receives the operation signal from the transmission unit of the portable wireless communication device and the detection unit of the vehicle has not detected the presence of the portable wireless communication device in any of the detection regions, the door unlocking device of the vehicle is configured to unlock all of the doors.

2. The door unlocking system according to claim 1, further comprising:

one or more wireless transmission units for wirelessly transmitting a signal, each of the wireless transmission units being associated with one or more of the doors, wherein the detection unit has a check signal transmission unit for transmitting a check signal with each of the wireless transmission units, and is configured to determine whether or not the communication device is present in accordance with whether or not a response signal in response to the transmitted check signals has been received by the wireless reception unit, and the communication device has:

a reception unit for wirelessly receiving the check signals transmitted from the wireless transmission units; and a response signal transmission unit for transmitting, if the reception unit has received the check signal, a response signal in response to the received check signal with the transmission unit.

3. The door unlocking system according to claim 2, wherein the detection unit further has an identification unit for identifying, if the response signal has been received with the wireless reception unit, a wireless transmission unit that has transmitted the check signal corresponding to the received response signal, and determines that the communication device is present in the detection region that is associated with a door corresponding to the identified wireless transmission unit.

4. The door unlocking system according to claim 2, wherein the transmission unit of the communication device and the wireless reception unit are configured to transmit and receive a wireless signal in a UHF (Ultra High Frequency) band, and the wireless transmission units and the reception unit of the communication device are configured to transmit and receive a wireless signal in an LF (Low Frequency) band.

5. The door unlocking system according to claim 2, wherein the communication device further has a notification unit for giving notification if the check signal transmitted by any of the wireless transmission units has been received by the reception unit.

6. The door unlocking system according to claim 1, further comprising:

a notification unit for giving, if the door unlocking device unlocks a door, notification in a mode that depends on the unlocked door.

7. The door unlocking system according to claim 1, wherein the detection unit is configured to detect the presence of the communication device at least for the detection region that is associated with a door on a rear seat side.

8. The door unlocking system according to claim 1, further comprising:

a vehicle-side operation unit for being subjected to an operation related to unlocking of a door of the vehicle, the vehicle-side operation unit being provided in an outer surface of the vehicle, wherein, when the vehicle-side operation unit has been operated in a case where the detection unit has detected the presence of the communication device, the door unlocking device is configured to unlock all doors.

9. The door unlocking system according to claim 1, further comprising:

one or more wireless transmission units for wirelessly transmitting a signal, each of the wireless transmission units being associated with one or more of the doors, wherein the detection unit has a check signal transmission unit for transmitting a check signal with each of the wireless transmission units, and is configured to determine whether or not the communication device is present in accordance with whether or not a response signal in response to the transmitted check signals has been received by the wireless reception unit, and the communication device has:

a reception unit for wirelessly receiving the check signals transmitted from the wireless transmission units; and a response signal transmission unit for transmitting, if the reception unit has received the check signal, a response signal in response to the received check signal with the transmission unit.

* * * * *